Feb. 6, 1968  A. H. BORMAN ET AL  3,367,211

TRANSMISSION

Filed Sept. 27, 1965

INVENTORS
August H. Borman,
Erkki A. Koivunen,
Roderick G. Tipping &
BY Nils P. Week

*A. M. Heiter*
ATTORNEY

United States Patent Office 3,367,211
Patented Feb. 6, 1968

3,367,211
TRANSMISSION
August H. Borman, Detroit, Erkki A. Koivunen and Roderick G. Tipping, Livonia, and Nils P. Week, Allen Park, Mich., assignors to General Motors Corporation, Detroit, Mich., a corporation of Delaware
Filed Sept. 27, 1965, Ser. No. 490,308
4 Claims. (Cl. 74—677)

ABSTRACT OF THE DISCLOSURE

A transmission having a three element torque converter combined with a single, dual pinion, planetary gear set to provide two forward drive ranges and a reverse drive range. In the low forward drive range the converter and gear set operate in series and in the high drive range the converter and gear set operate in series in one arrangement and provide split torque drive in another arrangement. In the reverse drive range the converter and gear set operate in series with stator drive.

Figure 1:
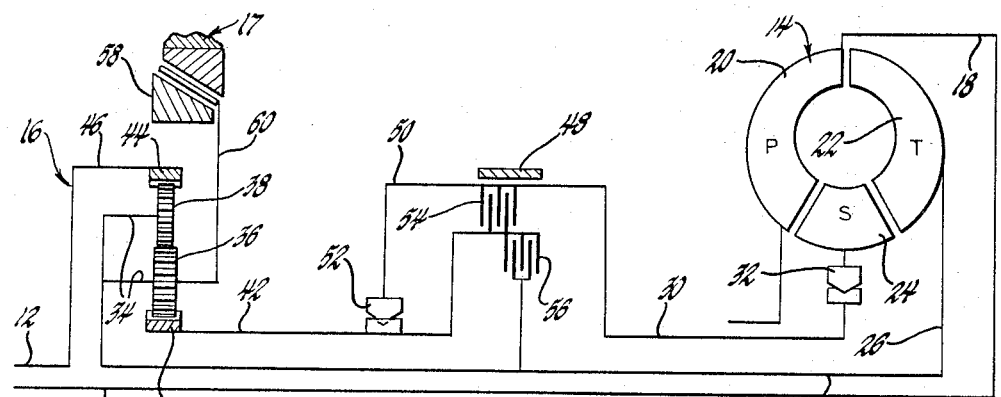

This invention relates to a transmission and more particularly to a torque converter and multiratio gear unit transmission providing single and plural power path drive.

A multiratio gear unit is combined with a hydrodynamic torque converter so that a prime mover, such as a piston engine, can efficiently meet the requirement of the load to be driven, the torque converter providing infinitely variable torque and speed ratios and the multiratio gear unit providing fixed torque and speed ratios. It is desirable that such a power train arrangement be producible at low cost, be compact, be simply controllable and have a high operating efficiency.

The transmission according to this invention comprises a three-element torque converter combined with a range unit having a dual pinion planetary gear set to provide two forward drive ranges and a reverse drive range. The input is by an input shaft centrally through the gear set to the torque converter whose turbine is connected to the carrier of the gear set which further has a sun gear and a ring gear connected by pairs of carrier supported pinions. The ring gear is connected to an output sleeve shaft surrounding the input shaft. In one embodiment, the low forward drive range is established by engaging a low brake to hold the converter stator and the sun gear through separate one-way couplings. The turbine drives the carrier and the output ring gear and connected output shaft are driven forwardly at a reduced speed by the series arranged converter and low ratio gear drive. Overrun braking for the transmission output is provided in low by engaging a double-duty clutch to clutch the sun gear to the engaged low brake to prevent sun gear freewheeling. The high forward drive range is provided by engaging a high clutch to connect the turbine to the sun gear so that the gear set provides a direct drive from the turbine to the output shaft while the low brake remains engaged to hold only the stator for reaction through its one-way coupling. The reverse drive range is provided by engaging a reverse brake to hold both the carrier and connected turbine for reaction and also engaging the double-duty clutch to clutch the sun gear to the stator one-way coupling, the low brake being disengaged. The stator becomes the turbine driving the sun gear backwards and the output shaft is driven in the reverse direction at a reduced speed by the series arranged converter and low ratio gear drive.

In another embodiment of the invention, the converter and gear set are arranged so that there is converter torque multiplication available only in the low and reverse drive range which drive ranges are provided with series arranged converter and gear drive and only converter fluid coupling in the high drive range which is provided with split torque drive. In another embodiment, the converter and gear set are arranged so that there is converter torque multiplication available in all of the drive ranges and split torque drive only in the high drive range.

An object of this invention is to provide in a torque converter and multiratio gear unit transmission, a new and improved arrangement of a dual pinion planetary gear set with a torque converter to provide a plurality of forward drive ranges and a reverse drive range.

Another object of this invention is to provide in a transmission, a hydrodynamic torque converter combined with a dual pinion planetary gear set to provide torque converter and reduction gear ratio series drive in a low forward drive range and a reverse drive range and a torque converter and locked gear unit series drive in a high drive range with there also being provided a selective nonreversible and reversible drive through the gear unit in the low drive range.

Another object of this invention is to provide in a transmisision, a torque converter combined with a dual pinion planetary gear set to provide converter torque multiplication in a low drive range and a reverse drive range which drive ranges have series arranged converter and gear ratio drive and only converter fluid coupling drive in a high drive range which has split torque drive.

Another object of this invention is to provide in a transmission, a hydrodynamic torque converter combined with a dual pinion planetary gear set to provide converter torque multiplication in a low and a high forward drive range and a reverse drive range and split torque drive only in the high drive range.

These and other objects of the invention will be more apparent from the following description and the accompanying drawing in which:

FIGURE 1 diagrammatically shows one embodiment of the transmission according to the invention.

Figure 2:
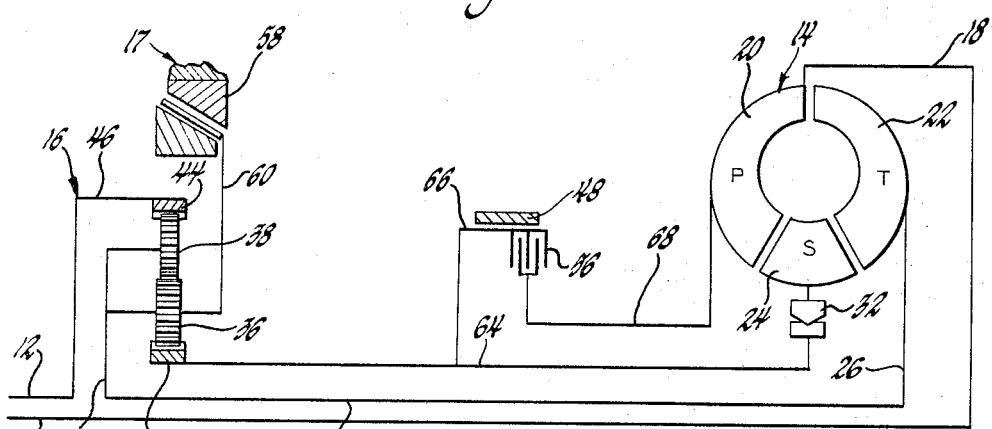

FIGURE 2 diagrammatically shows another embodiment of the transmission according to the invention.

Figure 3:
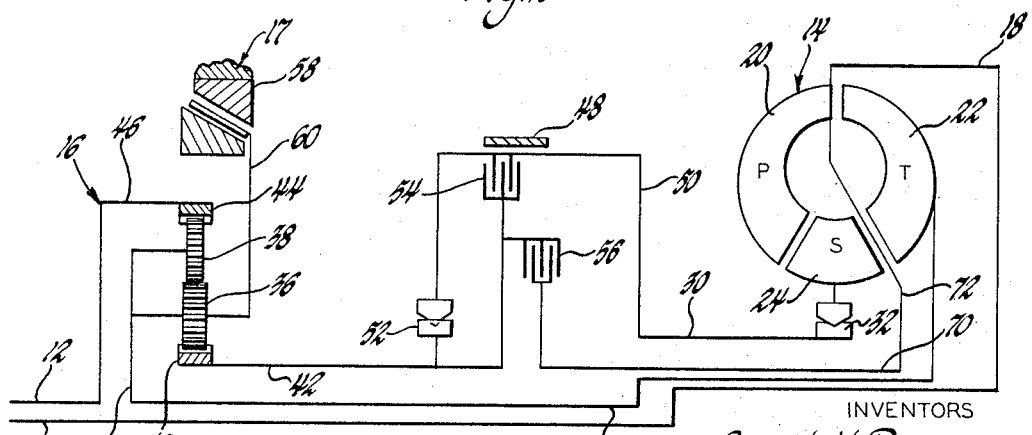

FIGURE 3 diagrammatically shows another embodiment of the transmission according to the invention.

The transmission shown in FIGURE 1 generally comprises a transmission input shaft 10, a transmission output shaft 12, which takes the form of a sleeve shaft received on the input shaft 10, and a hydrodynamic torque converter 14 and a dual pinion planetary gear set providing a range unit 16 for connecting the input shaft 10 to the output shaft 12. The converter 14 and range unit 16 are housed in a stationary transmission housing generally designated at 17. The input shaft 10 can be driven by any suitable prime mover such as a piston engine and the output shaft 12 can drive through a differential, either the front or rear wheels of a vehicle, this arrangement of the transmission component being particularly suitable for locating the transmission transversely of the vehicle.

The input shaft 10 is connected at the converter by a pump housing 18 to a vaned pump or impeller 20. Pump housing 18 generally provides the rotating torque converter housing enclosing the torque converter blading which in addition to the pump 20 includes a vaned turbine 22 and a vaned stator 24. The turbine 22 is connected by hub 26 to a turbine or converter output shaft 28 which is a sleeve shaft and surrounds input shaft 10. Stator 24 is mounted on a second sleeve shaft 30 surrounding shaft 28 by one-way coupling 32 which prevents, by the use of rollers or sprags, the stator from rotating relative to shaft 30 only on the reverse direction which is opposite the forward direction of the pump 20. The converter blading is of conventional design and provides the toroidal fluid circuit for the fluid with torque multiplication being made available by both the stator 24 and the turbine 22 by their connection with the range unit is described in detail later.

In the range gearing 16, the converter output shaft 28 is connected to a carrier 34 which rotatably supports a plurality of pairs of meshing pinions 36 and 38. The pinions 36 located at the inner radius mesh with an annular sun gear 40 which is mounted on a sleeve shaft 42 surrounding shaft 28. Pinions 38 at the outer radius mesh with the ring gear 44 which is connected by a drum 46 to the output shaft 12. A low brake 48 which is of the band type is provided for braking a drum 50 which is connected to the shaft 30 and is thus connectible with the stator 24 by the one-way coupling 32. Drum 50 is also connectible to the shaft 42 and connected sun gear 40 through another one-way coupling 52, which coupling prevents the sun gear 40 from rotating only in the reverse direction relative to drum 50. There is also provided a double-duty friction disk clutch 54 for clutching the drum 50 and the shaft 42 to bypass the continuously available operation of the one-way coupling 52. A high clutch 56 of the friction disk type is provided for clutching the converter output shaft 28 and the sun gear 40. A reverse brake 58 which is of the cone type, when engaged, is connected by a hub 60 to brake the carrier 34 and connected turbine 22.

The transmission thus described is capable of providing two forward drive ranges and a reverse drive range with overrun braking being available in the low forward drive range and there being provided stator reverse operation for the reverse drive range, all drive ranges being provided by a series arranged torque converter and geared drive. Describing now the operation of the transmission, the low drive range is provided on engaging the low band brake 48, all other drive-establishing devices being disengaged. Input power is then by the input shaft 10 centrally through the range unit 16 to the converter pump 20. Since the band brake 48 is engaged, the stator 24 is prevented from reverse rotation by the one-way coupling 32 and the sun gear 40 is prevented from reverse rotation by the one-way coupling 52. With the stator 24 thus held for reaction and the pump being driven in the forward direction, the turbine 22 and thus the range unit input carrier 34 are caused to be driven forwardly with the torque converter providing maximum torque multiplication at stall for maximum starting torque which torque ratio decreases until it reaches substantially 1:1 at the converter coupling speed whereafter the stator 24 freewheels in the forward direction on the one-way coupling 32 and the converter functions as a fluid coupling. With the carrier 34 thus driven and the sun gear 40 held for reaction, ring gear 44 and connected output shaft 12 are driven in the forward direction but at a reduced speed.

The double-duty clutch 54 is available to provide optional overrun braking in the low drive range. When clutch 54 is engaged, the sun gear 40 is locked to the reaction drum 50 held by the low brake 48 thus bypassing the one-way coupling 52 and preventing the sun gear from freewheeling in the forward direction such as during downhill vehicle braking which would otherwise occur since the one-way coupling 52 only prevents reverse rotation of sun gear 40. Thus, drive can be transmitted in the reverse direction from the output shaft 12 back through the carrier 34 and via the turbine 22 to the converter circuit so that the converter can provide a braking action to the prime mover.

The high forward drive range can be provided by leaving the low brake 48 engaged to hold stator 24 for reaction through the one-way coupling 32 and engaging the high clutch 56 to clutch the converter output shaft 28 to the sun gear 40 and thus lock up the range gear unit 16 since relative rotation is prevented between sun gear 40 and carrier 34. It will be appreciated that an upshift from the low drive range to the high drive range can thus be accomplished without simultaneously controlling the engagement of one drive-establishing device and the disengagement of another drive-establishing device since the double-duty clutch 54 will only need to be engaged in low for overrun braking and since as the clutch 56 is engaged, the sun gear reaction at sun gear 40 is relieved allowing the sun gear 40 to freewheel relative to the grounded drum 50 through the operation of the one-way coupling 52. This is advantageous since the control system is not called on to also disengage the low drive establishing device on the upshift.

The reverse drive range is established by engaging the reverse cone brake 58 to hold carrier 34 and connected turbine 22 and also engaging the double-duty clutch 54 to clutch the stator 24 through the one-way coupling 32 to the sun gear 40 and thus bypass the one-way coupling 52. The low brake 48 is disengaged. Stator 24 then becomes the turbine and the turbine 22 becomes the stator since it is held by the reverse brake 58. The stator 24 is thus driven in the reverse direction since the one-way coupling 32 prevents reverse rotation of stator 24 relative to shaft 30 and therefore the sun gear 40 is driven in the reverse direction. Since the sun gear 40 is being driven in the reverse direction and since the carrier 34 is held, the output shaft 12 is driven in the reverse direction at a reduced speed by the converter and range unit series arranged drive thus provided.

In the FIGURE 1 embodiment there is provided converter multiplication in all drive ranges. In the FIGURE 2 embodiment which has parts corresponding to the parts shown in FIGURE 1 identified by like numerals, there is provided converter multiplication in the low drive range and in the reverse drive range, and only converter coupling operation in the high drive range which is provided with a split torque drive arrangement. In the FIGURE 2 embodiment stator 24 is connectible by the one-way coupling 32 with a sleeve shaft 64 which surrounds shaft 28 and is directly connected to the sun gear 40. A drum 66 connected to shaft 64 can be braked by the low band brake 48 to hold both the stator 24 for reaction through the one-way coupling 32 and also to hold the sun gear 40 for reaction. Drum 66 can also be connected by the high clutch 56 to a sleeve shaft 68 which sleeve shaft surrounds shaft 64 and is connected to the pump 20 and thus input shaft 10 to provide a mechanical drive to the sun gear 40 bypassing the converter.

Describing the operation of the FIGURE 2 embodiment, the low drive range is established by engaging the low band brake 48 to hold the sun gear 40 for reaction and to hold the stator 24 for reaction through the operation of the one-way coupling 32. Converter turbine 22 drives the connected carrier 34 and with the sun gear 40 thus held for reaction, the ring gear 44 connected to the output shaft is thus caused to be driven in the forward direction at a reduced speed and thus has the same type of drive as provided in the low drive range in the FIGURE 1 embodiment. The high drive range is established by releasing the low band brake 48 and engaging the high clutch 56 to connect the sun gear 40 and the stator 24 to the pump 20 and thus input shaft 10. Thus, the stator 24 is caused to turn forward with the converter pump 20. Since the stator's reaction cannot be taken to ground, no torque multiplication is possible and the torque converter acts as a fluid coupling. Input to the range unit 16 is then through two paths, one a mechanical path from the input shaft 10 to the sun gear 40 and the other one a hydraulic path through the converter to the input carrier 34. Thus, a split torque arrangement is provided in the high drive range resulting in a higher mechanical efficiency because less torque is transmitted through the fluid drive so that there is correspondingly less slippage or speed ratio loss in the converter. There is no torque multiplication in the high drive range and a substantially 1:1 speed ratio drive is provided. The reverse drive range is established by engaging the reverse cone brake 58 to hold the carrier 34 and connected turbine 22. The stator 24 then becomes the turbine and rotates backwards driving the sun gear 40 in the reverse direction and thus the output shaft is driven in the reverse direction at a reduced speed like in the FIGURE 1 embodiment.

The embodiment shown in FIGURE 3 provides converter multiplication in all of the drive ranges and in addition provides split torque drive in the high drive range and has parts corresponding to the parts shown in FIGURE 1 identified by like numerals. In this arrangement the high clutch 56, when engaged, clutches the shaft 42 and connected sun gear and a sleeve shaft 70 which latter shaft is arranged intermediate shafts 28 and 30. Shaft 70 is connected to the pump housing 18 and thus input shaft 10 by a drive transmitting member 72 which extends through the converter eye. Thus, with clutch 56 engaged there is provided direct mechanical drive from the input shaft 10 through the torque converter to the sun gear 40.

Since the clutch 56 in the FIGURE 3 embodiment clutches the input shaft 10 to the sun gear 40 as compared with the FIGURE 1 embodiment which has the clutch 56 for clutching the turbine 22 to the sun gear 40, the FIGURE 3 embodiment provides the same low drive range and the reverse drive range operation as that described for the FIGURE 1 embodiment. Describing the high drive range provided by the FIGURE 3 embodiment, this drive range, which is established by engaging only the high clutch 56, has a mechanical power path from the input shaft 10 to the sun gear 40 and a hydraulic path via the turbine 22 to the carrier 34 so that torque multiplication by the converter is made available in the high drive range. Thus, there is provided a split torque arrangement which results in a higher mechanical efficiency because less torque is transmitted through the fluid drive with correspondingly less slippage or speed ratio loss in the high drive range. The FIGURE 3 embodiment therefore retains the converter torque multiplication in all of the drive ranges and in addition provides split torque drive in the high drive range for increased efficiency.

The above-described preferred embodiments are illustrative of the invention which it will be appreciated may be modified within the scope of the appended claims.

What is claimed is:

1. In a transmission the combination of an input member; an output member; a torque converter having a pump connected to said input member, a turbine and a stator; multiratio gear means for operatively connecting said torque converter to said output member including a single planetary gear set having a pair of input elements and an output element connected to said output member for driving said output member when either of said input elements is driven and the other is held and when both of said input elements are driven; connecting means including a first one-way coupling for connecting one of said input elements and said stator; the other of said input elements and said turbine being connected; a first brake for holding said connecting means at a point between said one input element and said one-way coupling; a second brake for holding said other input element; said connecting means also including a second one-way coupling in series with said first one-way coupling and further including a first clutch in parallel with said second one-way coupling; said first brake being arranged to hold said connecting means at a point between said one-way couplings; and a second clutch cooperable with said connecting means between said second one-way coupling and said one input element for connecting said one input element and said turbine.

2. In a transmission the combination of an input member; an output member; a torque converter having a pump connected to said input member, a turbine and a stator with said pump being operable to drive said turbine in one direction when said stator is held and also to drive said stator in the opposite direction when said turbine is held; multiratio gear means operatively connecting said torque converter to said ouput member including a dual pinion planetary gear set having a single sun gear, a single ring gear connected to said output member, and a carrier connected to said turbine, said carrier having a pair of meshing pinions with one of said pinions meshing with said sun gear and the other pinion meshing with said ring gear; connecting means including a pair of one-way couplings connected by a drum and a clutch located in said drum and arranged in parallel with one of said one-way couplings for connecting said sun gear and said stator; a brake for holding said drum; a brake for holding said carrier; and another clutch located in said drum and cooperable with said connecting means between said sun gear and said one, one-way coupling for connecting said sun gear and said turbine.

3. In a transmission the combination of an input member; an output member; a torque converter having a pump connected to said input member, a turbine and a stator; multiratio gear means for drivingly connecting said torque converter to said output member including a single planetary gear set having a pair of input elements and an output element connected to said output member for driving said output member when either of said input elements is driven and the other is held and when both of said input elements are driven; connecting means including a first one-way coupling for connecting one of said input elements and said stator; the other of said input elements and said turbine being connected; a first brake for holding said connecting means at a point between said one input element and said first one-way coupling; a second brake for holding said other input element; said connecting means also including a second one-way coupling in series with said first one-way coupling and further including a clutch in parallel with said second one-way coupling; said first brake being arranged to hold said connecting means at a point between said one-way couplings; and another clutch cooperable with said connecting means between said one input element and said second one-way coupling for connecting said input member and said one input element.

4. In a transmission the combination of an input member; an output member; a torque converter having a pump connected to said input member, a turbine and a stator with said pump being operable to drive said turbine in one direction when said stator is held and also to drive said stator in the opposite direction when said turbine is held; multiratio gear means operatively connecting said torque converter to said output member including a dual pinion planetary gear set having a single sun gear, a single ring gear connected to said output member, and a carrier connected to said turbine, said carrier having a pair of meshing pinions with one of said pinions meshing with said sun gear and the other pinion meshing with said ring gear; connecting means including a pair of one-way couplings connected by a drum and a clutch located in said drum and arranged in parallel with one of said one-way couplings for connecting said sun gear and said stator; a brake for holding said drum; a brake for holding said carrier; a drive transmitting member extending through said torque converter and connected to said input member; and another clutch located in said drum and cooperable with said connecting means between said sun gear and said second one-way coupling for connecting said drive transmitting member and said sun gear.

References Cited

UNITED STATES PATENTS

| | | | |
|---|---|---|---|
| 2,402,164 | 6/1946 | Kelbel | 74—677 |
| 2,414,359 | 1/1947 | Carnagua | 74—677 |
| 2,456,328 | 12/1948 | Schneider | 74—677 |
| 2,890,600 | 6/1959 | Smirl et al. | 74—677 |
| 2,901,923 | 9/1959 | Waclawek | 74—688 |
| 2,908,190 | 10/1959 | Hause | 74—677 X |
| 2,940,336 | 6/1960 | Simpson et al. | 74—677 X |
| 3,016,768 | 1/1962 | De Lorean | 74—677 |
| 3,055,232 | 9/1962 | Dodge | 74—677 |
| 3,270,585 | 9/1966 | Livezey | 74—677 |
| 3,299,739 | 1/1967 | Stockton | 74—677 |

DONLEY J. STOCKING, *Primary Examiner.*

ARTHUR T. McKEON, *Examiner.*

J. J. BENEFIEL, *Assistant Examiner.*